United States Patent [19]

Hakiel et al.

[11] Patent Number: 4,921,556
[45] Date of Patent: May 1, 1990

[54] WRINKLE FREE LAMINATION METHOD FOR RELEASABLY LAMINATED, STRETCHED WEBS

[75] Inventors: Zbigniew Hakiel, Webster; Gerald G. Reafler; Robert W. Schrader, both of Rochester; James R. Schuler, Brockport, all of N.Y.

[73] Assignee: Eastman Kodak Company, Rochester, N.Y.

[21] Appl. No.: 272,271

[22] Filed: Nov. 17, 1988

[51] Int. Cl.$^5$ .............................................. B32B 31/08
[52] U.S. Cl. ................................... 156/164; 156/163; 156/192; 156/229; 156/289; 156/324; 156/495
[58] Field of Search ............... 156/289, 164, 163, 160, 156/229, 324, 495, 192, 555

[56] References Cited

U.S. PATENT DOCUMENTS

| | | | |
|---|---|---|---|
| 2,594,229 | 4/1952 | Snyder et al. | 156/229 X |
| 3,081,212 | 3/1963 | Taylor et al. | 156/164 |
| 3,361,609 | 1/1968 | Borack et al. | |
| 3,518,152 | 6/1970 | Storti | 156/289 X |
| 3,672,949 | 6/1972 | Brown | 156/164 X |
| 4,151,319 | 4/1979 | Sackoff et al. | 156/289 X |
| 4,188,248 | 2/1980 | Millgardh et al. | 156/164 |
| 4,568,403 | 2/1986 | Egan | 156/289 X |
| 4,693,858 | 9/1987 | Volke | |
| 4,751,121 | 6/1988 | Kühnel et al. | |

Primary Examiner—Michael W. Ball
Assistant Examiner—Jeff H. Aftergut
Attorney, Agent, or Firm—William J. Davis

[57] ABSTRACT

A protective web is releasably laminated to an adhesive-coated stretchable web by continuously drawing the webs at differential degrees of tensile strain into laminating contact in the nip formed by a resilient and a non-resilient roller.

5 Claims, 1 Drawing Sheet

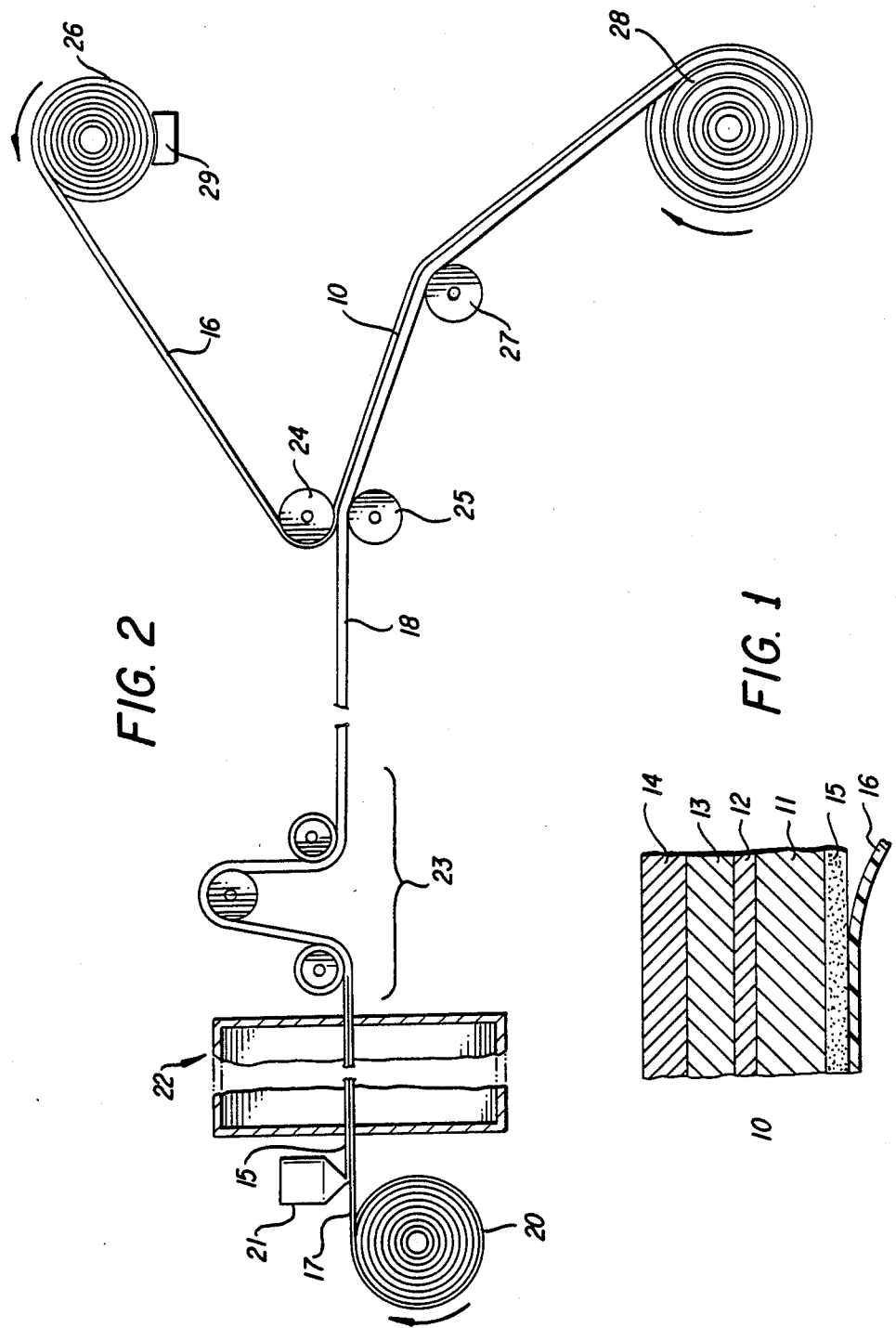

WRINKLE FREE LAMINATION METHOD FOR RELEASABLY LAMINATED, STRETCHED WEBS

FIELD OF INVENTION

This invention relates to a method of laminating polymeric webs and, more particularly, to a method for continuously laminating a releasable protective web to an adhesive-coated stretchable web.

BACKGROUND

The patent application of Gerald R. Reafler Ser. No. 116,426 filed Nov. 3, 1987 describes a new kind of protective and decorative sheet material which can be thermoformed and bonded to the surfaces of automobile panels, household appliances and other articles. The sheet material is formed by the continuous laminar flow coating of a paint, such as a water-based polyurethane composition, onto a moving web of a stretchable polymeric film onto which an optional primer or tie coat has previously been coated. Then, over the dried paint layer, is coated a clear top coat to provide gloss and other desired surface qualities.

A principal way of using this sheet material is to bond it adhesively to automobile panels or the like by thermoforming. To provide this capability the stretchable web, which on one side has a dried paint layer and top coat, is coated on its other side with a pressure-sensitive adhesive. After coating and drying the adhesive layer, the coated web must be wound up as a supply roll for future use in thermoforming. The kind of adhesive that is desired for bonding the sheet material to surfaces, however, is so tenaciously sticky that a protective film must be laminated to the adhesive-coated side to facilitate handling and later unwinding of the roll.

Although the lamination of protective release sheets to adhesive-coated webs is known (see, for example, U.S. Pat. Nos. 3,361,609, 4,693,858 and 4,751,121) the kind of web with which the present invention is concerned presents unusual problems that are not solved by conventional interleaf laminating practices.

A number of polymeric films, such as polyethylene terephthalate films, are useful as the releasable protective web. They adhere adequately to the pressure-sensitive adhesive, and can later be peeled away. It has been found, however, that when the laminated web is rolled up and later unwound, the releasable protective film partially delaminates from the adhesive layer. This can occur immediately upon unwinding or when the web is laid flat to be cut into sheets for thermoforming. This is not usually a complete delamination but a partial delamination which appears as wrinkles or linear delaminations in small or large areas of the web. The wrinkles can create a visible pattern in the viewing side of the sheet material. For high quality product the wrinkled area must be cut out or trimmed from the edges of the sheet material, thus causing substantial waste.

It appears that the wrinkling problem is related to the fact that the paint coated web is stretchable and thermoplastic, as it must be in order that it can be thermoformed and bonded to three-dimensional substrates. On the other hand, since the web must be drawn under tension through heated drying zones during its manufacture, it appears that at least a small degree of undesired stretching of the web occurs before the protective web is laminated to it.

Although the invention should not be limited to this theoretical explanation of the mechanism it appears that the slightly stretched paint coated web shrinks after it has been laminated to the release film. When wound as the outer layer of a roll, the web remains under tension and little if any delamination occurs but when unwound and flattened the wrinkles appear. A solution to this problem has been needed.

BRIEF SUMMARY OF THE INVENTION

In accordance with the present invention a method is provided for continuously laminating a protective web to a stretchable adhesive-coated web in such a manner that delamination or wrinkling of the protective web upon unwinding of a roll of the laminated web is eliminated or reduced. The method comprises continuously drawing a stretchable, adhesive-coated first web, which previously has been drawn through a heated drying zone, through a nip. The nip is formed by a resilient roller and a smooth non-resilient roller which has a relatively low coefficient of friction and the adhesive coating of the web faces toward the non-resilient roller. Also continuously drawn into the nip on the adhesive-coated side of the first web is a thinner, stretchable second web. The latter is drawn into the nip around the non-resilient roller of relatively low coefficient of friction under higher tensile strain than the first web. The first and second webs are pressed into laminating contact in the nip to form a releasably laminated web. The laminated web is thereafter wound-up as a roll with the thinner second web on the outside of the roll.

THE DRAWINGS

The invention will be further described with reference to the drawings of which

FIG. 1 is a diagrammatic cross-sectional view of a laminated sheet material made by the process of the invention;

FIG. 2 is a diagrammatic sideview of apparatus with which the process of the invention can be carried out.

DETAILED DESCRIPTION

The invention is described herein with particular reference to the manufacture of thermoformable decorative and protective laminates used in the automotive industry. This field of manufacture involves highly precise operations in which, at one stage, the problem-free conveyance and handling of an adhesive-carrying web is of considerable importance, so that the invention is especially beneficial. However, the method of the invention can be used in the manufacture of any stretchable film product wherein a continuously moving web having a pressure-sensitive adhesive layer which may come into contact with surfaces to which it might prematurely adhere prior to its bonding to a substrate. For example, the web can be a paint-coated stretchable film, as examplified herein, or such a film having other kinds of coatings, or even an uncoated stretchable film.

FIG. 1 is a diagrammatic cross-sectional side view, not to scale, of a flexible and stretchable sheet material or film 10 of the type described in the aforementioned patent application of G. G. Reafler. The sheet material comprises a thermoplastic carrier film 11 which is an essentially planar, self-supporting, stretchable, thermoplastic polymeric film. It has a substantially uniform thickness in the range from about 0.05 to 0.40 millimeters. A preferred mean thickness is in the range from about 0.16 to 0.32 millimeters.

Suitable polymeric materials for the carrier film 11 include stretchable thermoplastic polymeric material having heat softening and tensile elongation properties suitable for thermoforming or vacuum forming processes. Especially useful are the stretchable blended compositions disclosed in the patent to Weemes et al, U.S. Pat. No. 4,582,876, and in the copending application of Seymour, Ser. No. 151,727 filed Feb. 3, 1988.

Coated on the carrier film 11 is a basecoat (or paint layer) 13 which has a mean dry thickness in the range from about 0.012 to 0.080 millimeters and, preferably, from about 0.020 to 0.060 millimeters. The paint layer is formed by laminar flow coating of a basecoat composition of the types used for automotive finishes. The preferred compositions are aqueous dispersions of a film forming binder resin and pigment with one or more organic solvents which serve as coalescing agents or the like.

Although not essential in all cases, a thin bonding layer (or tie coat) 12 can be coated and dried on the carrier film before the paint layer is coated in order to improve the bonding of the paint layer to the carrier film. This layer preferably has a dry thickness not greater than about 0.0025 millimeter, and thus is much thinner than the dried basecoat.

Clearcoat layer 14 is a transparent topcoat having a mean dry thickness in the range from about 0.010 to 0.70 millimeters and preferably comprises a crosslinked polymer such as a crosslinked polyurethane formed by mixing a polyester polyol and a polyisocyanate curing or crosslinking agent.

Subsequent coated on the carrier film 11 opposite the paint layer is an adhesive layer 15, i.e., the layer to which the releasable protective web is subsequently laminted by the method of the present invention. Because this particular material is intended for covering substrates such as automobile panels and because it is to be bonded to them by vacuum thermoforming or other means, it carries an adhesive layer which is pressure-sensitive and form permanent, tenacious bonds. Preferred adhesives of this type are acrylic adhesives. Examples of such compositions include acrylic copolymers of a higher alkyl acrylate such as 2-ethylhexyl acrylate copolymerized with a polar comonomer such as acrylic acid, acrylamide or maleic anhydride. The adhesive is coated from a solution with water or an organic solvent which also can contain additives such as a tackifier resin. Further examples of useful acrylic pressure-sensitive adhesives are described in the patent to Traynor et al, U.S. Pat. No. 4,726,982 of Feb. 23, 1988.

The adhesive layer preferably is applied to the carrier film by a laminar flow coating method as described in U.S. patent application Ser. No. 116,426 at a dry thickness of about 0.04 to 0.12 millimeters. Advantageously, the adhesive layer is coated by means of a high precision extrusion hopper, for example, as described in U.S. Pat. No. 2,681,294.

Following the application of the adhesive layer 15, the sheet material is interwound with a thin releasable protective web 16 of, e.g., polyester film, to permit tack-free winding of the laminated sheet material 10 on a core.

FIG. 2 is a diagrammatic illustration of one form of apparatus for practicing the invention:

Coated sheet material 17, comprising carrier film 11 plus layers 12–14 as shown in FIG. 1, is fed continuously from supply roll 20 opposite coating means 21 for applying a layer of pressure-sensitive adhesive 15 and then transported sequentially as sheet material 18 through drying means 22 and the conveyor section 23 to the nip formed by non-resilient roller 24 and resilient roller 25 for interwinding with protective web 16 being unwound from supply roll 26. The releasably laminated web 10 is then drawn over guide roller 27 onto take-up roll 28.

A distinguishing feature of the method of this invention is the application of different tensile strains to the adhesive coated web 18 and the protective web 16 as they arrive at the nip formed by rollers 24 and 25 such that the tensile strain in protective web 16 is greater than that in the adhesive coated web 18. This strain differential ensures that the protective web 16 does not buckle or delaminate when the sheet material is unwound from take-up roll 28 in preparation for the thermoforming operation. The required tensile strain can be applied to the protective web 16 by tension controlling means, such as a brake 29 attached to supply roll 26. Since the roller 24 has a smooth, non-resilient surface of relatively low coefficient of friction, the tensile strain in web 16 is transmitted to the nip between rollers 24 and 25 where the two webs are releasably bonded together. The desired lower tensile strain can be applied to the adhesive coated web 18 by controlling the web's tension on its pass from supply roll 20 to take-up roll 28 by a combination of means commonly used in web transport operations. The desired relative tensile strains can additionally be adjusted by varying the pressure between rollers 24 and 25 as well as the physical properties, such as thickness and the chemical composition, of the adhesively coated web 18 and protective web 16.

The invention is further illustrated by the following examples which provide a comparison of the method of the invention with other procedures.

EXAMPLE 1 (INVENTION)

Continuously moving stretchable webs of sheet material 18 and protective film 16 as identified hereinbefore were pressed into contact in the nip formed by non-resilient roller 24 (having a smooth metal surface) and resilient roller 25 (having a rubber surface) to permit tack-free winding of the laminated web 10 onto the take-up roll 28 as schematically illustrated in FIG. 2. Web 18 included a carrier film formed of the stretchable polymer blend described in Weemes, U.S. coated on one side with a polyurethane paint layer and a clear coat and on the other side with an acrylic pressure-sensitive adhesive. The protective film or release sheet 16 was a silicone-coated polyethylene terephthalate film of 0.04 mm thickness. The nip pressure between rollers 24 and 25 was maintained at 138 kPa. The web tensions were adjusted such that the tensile strain in web 16 was greater than that in web 18. As shown in FIG. 2, the adhesive coating of web 18 faced toward the non-resilient roller 24 and the laminated web 10 was wound onto the take-up roll with web 16 on the outside.

The cover sheet showed no tendency to delaminate prematurely from the adhesive layer when the sheet material was unwound 24 hours later for thermoforming bonding to a substrate. The bonded sheet material provided an excellent, wrinkle-free protective and decorative surface on the covered substrate.

EXAMPLE 2 (INVENTION)

Good results similar to those described in Example 1 were obtained when the nip pressure between rollers 24 and 25 was maintained at 276 kPa and the other conditions were unchanged.

EXAMPLE 3 (COMPARISON)

When the interwound sheet material 10 was wound onto the take-up core 28 with the protective film 16 on the inside of the roll, instead of on the outside as in Example 2, delamination or wrinkling of the protective web 16 occurred.

EXAMPLE 4 (COMPARISON)

When rollers 24 and 25 in FIG. 2 were interchanged such that the web 16 was now contacting the resilient (rubber) roller 25 prior to arriving at the web contact point in the nip, delamination or wrinkling of web 16 occurred. It is believed that the resilient surface of roller 25, which had a higher coefficient of friction than the smooth metal roller 24, interferred with the transmittal of the higher tensile strain in web 16 to the point of contact with web 18 at the nip.

EXAMPLE 5 (COMPARISON)

Results similar to those of Example 4 are obtained when the relative tensions applied to webs 16 and 18 are changed such that the tensile strain in web 16 is equal to or lower than that in web 18.

The invention has been described in detail with particular reference to preferred embodiments thereof, but it will be understood that variations and modification can be effected within the spirit and scope of the invention.

We claim:

1. A method of releasably laminating a first stretchable web which has been coated with an adhesive layer and drawn through a heated drying zone, whereby said first web is at least slightly stretched, to a second web to protect the adhesive coating of the first web, which comprises:
   (a) continuously drawing the first web through a nip formed by a resilient and a non-resilient roller, with the adhesive coating facing toward the non-resilient roller,
   (b) continuously drawing a second stretchable web having relatively higher tensile strain than the first web around the partial periphery of the non-resilient roller into the nip on the adhesive-coated side of the first web,
   (c) pressing the first and second webs at moderate pressure into laminating contact in the nip to form a releasably laminated web, and
   (d) winding up the laminated web as a roll with the second web on the outside of the roll, said laminated web being wrinkle-free and resistant to partial delamination and wrinkling when unwound, the stretchable second web being continuously unwound from a supply roll having a web tension controlling means,
and the surface of the non-resilient roller having a lower coefficient of friction than the surface of the resilient roller so that the tensile strain applied to the second web is transmitted to the nip.

2. A method according to claim 1, wherein the non-resilient roller has a smooth metallic surface and the resilient roller has a rubber surface.

3. A method according to claim 1, wherein the first web comprises a blend of copolyesters based on poly(1,4-cyclohexylenedimethylene terephthalate) and rubber-modified styrene-maleic anhydride copolymers, and the second web comprises a polyester.

4. A method according to claim 1, wherein the thickness of the first web ranges from 0.1 to 0.5 mm and the thickness of the second. web ranges from 0.01 to 0.06 mm.

5. A method of manufacturing a thermoformable paint-coated film web having a paint layer coated on one side of a stretchable thermoplastic carrier film web and a pressure-sensitive adhesive layer on the other side, which comprises
   coating said adhesive layer on said carrier film web and drawing the adhesive-coated web through a heated drying zone to dry the adhesive layer, whereby said web is at least slightly stretched,
   continuously drawing the adhesive-coated web through a nip formed by a resilient and a non-resilient roller, with the adhesive coating facing toward the non-resilient roller,
   applying a tensile strain to a second and thinner stretchable web and continuously drawing said web around part of the periphery of the non-resilient roller into said nip in contact with the adhesive layer of the adhesive-coated web, said second web having a release coating on its side in contact with the adhesive layer,
   pressing the webs at moderate pressure into laminating contact in the nip to form a releasably laminated web,
   winding up the laminated web as a roll with the second web on the outside of the roll, and
   wherein the surface of the non-resilient roller has a lower coefficient of friction than the surface of the resilient roller, whereby the tensile strain applied to the second web is transmitted to the nip, and
   wherein the laminated web is wrinkle-free when thereafter unwound, is resistant to partial delamination and wrinkling of the second web and is free of visible patterns in the paint layer resulting from such partial delamination.

* * * * *